Dec. 26, 1961 W. E. DUTCHESS 3,014,437
VARIEGATOR FOR ICE CREAM AND THE LIKE
Filed Nov. 30, 1959

INVENTOR
WILBUR E. DUTCHESS
BY
ROBERT CALVERT
ATTORNEY.

3,014,437
VARIEGATOR FOR ICE CREAM AND THE LIKE
Wilbur E. Dutchess, Ramsey, N.Y., assignor to The Borden Company, New York, N.Y., a corporation of New Jersey
Filed Nov. 30, 1959, Ser. No. 856,184
4 Claims. (Cl. 107—1)

This invention relates to apparatus for variegating or marbleizing ice cream, sherbets, candies and like plastic products.

The invention is particularly useful in introducing into ice cream stripes (ripples) of differently colored ice cream, sauces, nut and fruit particles suspended in sauces, flavors and the like. It will be first illustrated in connection with such use.

Although ice cream having differently colored material twisted therein has been in extensive use for a long time, the manufacturers have had much difficulty in controlling the revel, such as changing the caliber of the stripes, without opening the variegator and interrupting the operation. Sometimes the twisted stripes will be mostly on the outside of the finished packed unit of ice cream; at other times, they are displaced toward the center; too thin or too wide; or, in the case of sauces that are not themselves frozen as introduced, settled largely to the bottom of the package.

The present invention provides apparatus and means for controlling the operation entirely from the outside of the variegator. This outside control makes possible changing at any moment the number of streams of the differently colored material introduced into the ice cream, the relative calibers of the several streams, and the transition at will from wide to thin bands of the sauce or other rippling material.

The invention comprises the apparatus described herein. In the preferred embodiment, it comprises means for causing ice cream or like plastic product to flow in generally straight or non-sinuous manner around tubes, means for causing the striping material to flow in generally non-sinuous manner through the said tubes at a pressure at least equal to that on the said product, means for varying the number of the tubes through which the said material is being introduced at any given time, and means for changing the amount introduced through any one of the said tubes independently of the amount being delivered through another of the tubes.

Figure 2:
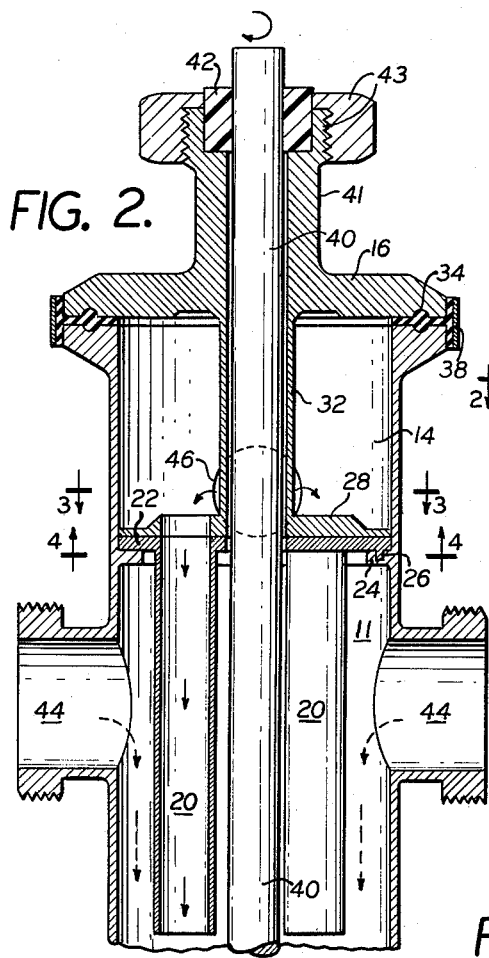
Figure 1:
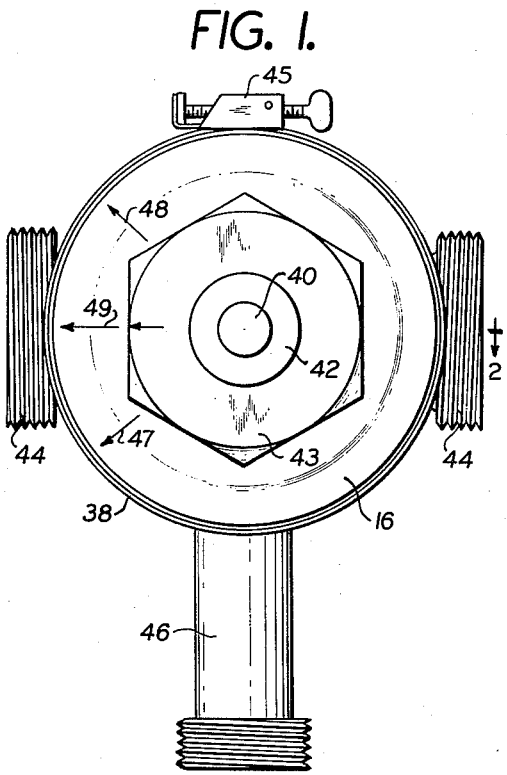
Figure 3:
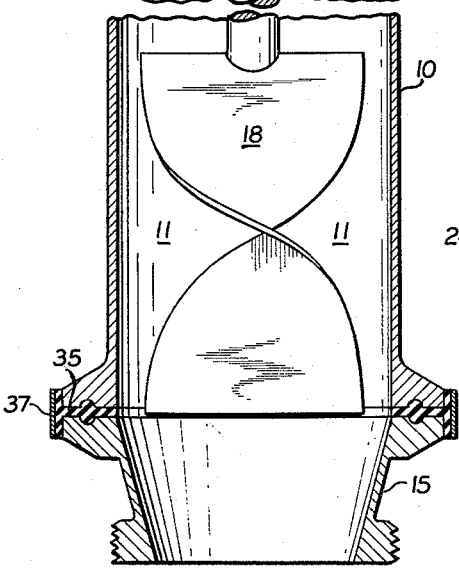
Figure 3:
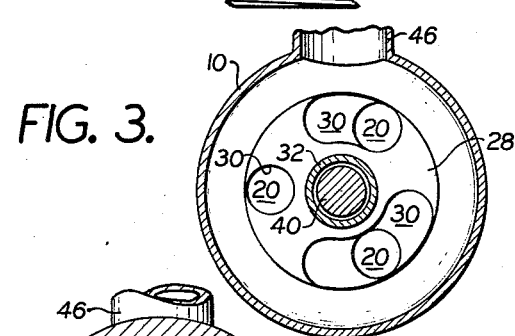
Figure 4:
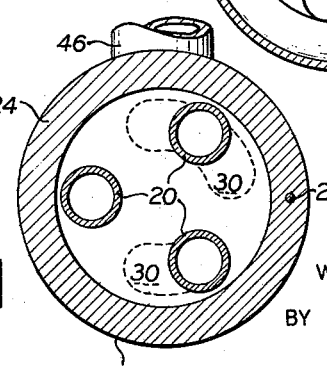

In the attached drawings:
FIG. 1 is a plan view of the apparatus of the invention.
FIG. 2 is a sectional view on line 2—2 of FIG. 1.
FIG. 3 is a sectional view on line 3—3 of FIG. 2.
FIG. 4 is a sectional view on line 4—4 of FIG. 2.

There is shown an upright cylindrical container 10 having a lower chamber 11 in which the actual variegation is effected. The container has an outlet 15, an upper chamber 14 through which the striping material is supplied with cover or lid 16 therefor. The rotor or twister 18 operates in the lower part of the chamber 11 and below the lower ends of a plurality of inlets including tubes 20 serving as inlets for delivering the striping material downwardly into the said chamber, the tubes 20 extending approximately parallel to each other and to the longer axis of the container and being mounted in holes in the tube sheet or separator 22 dividing the container into the two chambers, 11 and 14. This separator is supported on the annular flange 24 integral with the wall of the container 10 and locked non-rotatably, by pin 26 fitting removably upwardly into a recess in the said flange.

Disposed immediately above the open upper ends of the tubes 20 and resting on the separator 22 is plate 28 provided with openings 30 of such size and spacing as to register at certain angular settings of the plate with the tubes 20 at the tops thereof. These openings 30 are shown as 3 in number. They are kidney shaped in two instances and circular in one case, the latter in FIG. 3 being in complete registration with the opening of the same size in one of the said tubes and not readily distinguished in the figure.

The sleeve 32 depending from the lid 16 is integrally united at its lower end to the plate 28 and at its upper end to the lid. The plate 28 rests in conforming relationship and rotatably upon the separator 22.

The lid rests upon and against the annular gasket 34 of modified T-shape of cross section. The band 38 carries a tightening mechanism 45. When the screw thereof is tightened, then the band 38 prevents rotation of the lid and of the attached plate 28 with the openings 30 therethrough. When the tightening screw is loosened, then the lid and attached plate may be rotated by manual force applied externally to any part of the said lid, as to the handhold 41, so as to change the setting of the opening 30 with respect to the open upper ends of the tubes 20. Indicator arrows 47, 48 and 49 of FIG. 1, when set in line with the center of pipe 44 to the left in FIG. 1, place the openings 30 in register with 1, 2, or 3 respectively, of the tubes 20. These arrows are near the periphery of the lid. They show the angular setting of the lid for various positions of the openings 30 with respect to the tubes 20.

Gasket 35 and the tightening band 37, at the joint between the container and the outlet 15, are of the same construction and shape as 34 and 38, respectively.

A drive shaft operates the twister 18, extends through circular holes in the tube sheet 22, the plate 28, sleeve 32, and lid 16 and through the bushing 42 in the stuffing box 43. Power is supplied to this shaft in any conventional manner, as by air or electric motor and drive, not shown.

Inlet pipe 44 admits the ice cream to the lower chamber 14 at a level above the lower or outlet ends of the tubes 20 and suitably near the middle or upper parts thereof. Pipe 46 admits the variegating material to the said upper chamber 14, i.e., above the plate 28, both the said material and product being introduced suitably by positive pumps of usual kind (not shown) and the said material being introduced at a higher pressure than the plastic product, so that the former is forced as streams into the latter.

The dimensions of the apparatus are those that are usual in ice cream variegators. In a representative variegator, the length of the container 10 is ordinarily about a foot, the drive shaft 40 about ½ inch, and the inside diameters of the tubes 20, the inlet pipes 44 for the ice cream, and the inlets 46 for the variegating material, about ½, 1½, and 1 inch respectively, the inlets when in the form of the tubes 20 being about 4–5 inches long. The diameter of 10 is about 3 inches.

The plate 28 fits closely although in freely rotatable manner within the cylindrical container 10. Since the plate is integral with the lower end of the sleeve 32 disposed centrally with respect to the plate, this fit of the plate maintains the sleeve and also the drive shaft 40 in axial alignment with the container 10 and prevents whipping or wobbling of the twister 18 and of the said shaft during their rotation.

Materials of construction are also those that are conventional in the ice cream industry. All parts are metal parts except the gaskets and suitably stainless steel throughout. The bushing 42 is advantageously any firm nylon plastic. Gaskets 34 and 35 are neoprene.

The twister is any slow speed type of rotor that is common in this industry of rippling ice cream, as, for instance, about half a turn of a ribbon auger of overall width about 0.5–1 inch less than the internal diameter of the container 10 and of length from top to bottom approximately 4 inches. The speed of rotation of the twister 18 is made slow so as to cause a twisting of the variegated material without objectionable blending, a suitable rate being 1 complete turn of the twister for each inch of length of the column of variegated product moving downward through the chamber 11.

Examples of products other than ice cream that may be thus variagated are sherbets, custards, thick candy mixes, and other products that are plastic, i.e., substantially non-flowable except under pressure such as given by the pumps in the variegating plant. Ice cream at about 20°–24° F., for example, is an illustration of a desirable consistency in this product at the time of the introduction of the variegating stripes.

Examples of the differently colored materials to be introduced as the spaced columns or stripes and then twisted are frozen desserts of different colors or flavors or both from the product supplied through pipes 44, fudge, and all kinds of sauces or like materials that are commonly reveled into ice cream such as those of chocolate, butterscotch, raspberry, strawberry, or peppermint. Such material is sometimes called the flavor. When the said material is a sauce, it is introduced to advantage at a temperature above its initial freezing point, as at about 40°–70° F. and usually at about 40°–60° F., but below the temperature at which it would cause melting of a substantial amount of the ice cream.

Proportions of the materials being marbleized will vary in accordance with known practice, as from 2–25 pounds of the variegating material for 100 total of the said material and the ice cream or other plastic being variegated. Thus I use to advantage 4% when the flavor is peppermint and 18%–20% when a chocolate fudge.

The operation will be largely evident from the description of the apparatus that has been given.

The chamber 11 is filled by positive pumps with the plastic product to be variegated. The sauce or other variegating material is introduced through line 46 into the upper portion 14 of the container, also by positive pumps, in such amounts and at a pressure moderately above that in chamber 11, so that the material is forced downward through the one or ones of the tubes 20 that are placed in registration with the holes 30 in the plate 28. The pressure, consistency of the sauce or other material delivered downward through the tubes 20, and the setting of openings 30 in relation to the tubes 20 are controlled so that the material flows through the tubes 20 in proportion and in the number of streams desired in the finished, rippled output and that the downward flow rate of the sauce or the like through tubes 20 and of the plastic product through the container 10, at the level of the lower outlet ends of the tubes 20, will be practically the same.

The twister 18, for each complete rotation thereof at slow speed, introduces about one complete twist in the stripes or columns of variegating material, the twist being less than 360° by the angular strippage of the variegated product on the auger.

The ice cream or other product so variegated then passes through outlet 15 to any conventional type of receiver, as to an ice cream carton or other package for the finished variegated output.

As to the sizes of the openings 30 in the plate 28, all are equal in shortest dimension to the diameter of the open ends of the tubes. One of the openings of elongated shape, such as kidney shape, is of length about twice that of the said diameter and the other such opening about three times this diameter. By rotating the plate 28, one, two or three of the openings may be placed in registration with the tubes. In FIG. 3, all openings and tubes are in registration. For maximum adjustability it is required that the spacing of the tubes and the openings be such that, when the circular hole in the plate 28 registers with a tube, then the shorter kidney shaped opening registers at an end thereof with another of the tubes and the third and longer kidney shaped opening registers at its midportion with one of the said tubes, all as shown in FIG. 3. In FIGS. 3 and 4 the drawings are to scale, the circular one and the longest of the said openings 30 being spaced 120° apart on centers. The openings of intermediate length are spaced at the midpoint of an end thereof 120° from the said centers, so as to register as shown in FIGS. 3 and 4. All tubes 20 and openings 30 are equidistant radially from the axis of the drive shaft 40, as shown.

Suitable pressures on the pumps delivering the ice cream or like product to chamber 11 and the striping material to chamber 14 are 20–100 p.s.i., ordinarily about 20–80 pounds. The pressure selected is always higher on the variegating material than on the plastic product, so that the former is forced into the latter.

Because of the construction shown and the higher pressure in part 14 than in chamber 11, there can be no leakage from chamber 11 into 14 and no passage of the sauce from 14 into 11 except through the variegating material inlets such as the holes in separator 22, which holes are in alinement with the tubes 20.

By manual rotation of the lid 16, an opening or openings 30 can be caused to register in part only with an inlet or inlets 20, so as to form a smaller stream or smaller streams of the variegating material passing into the ice cream. Thus slight rotation of the plate 28 in FIG. 3 counter-clockwise will cause two of the openings in the said plate to register only in part with entrances to the two tubes 20 therebelow while leaving an end of the larger longer kidney shaped opening 30 in complete communication with a tube 20. Rotation of the plate clockwise from the position shown in FIG. 3 can place either one or two of the openings 30 in complete registration or three of the openings in partial registration with the tubes 20.

It is possible to have all possible combinations of conditions such as partial opening of area $\frac{1}{8}$, $\frac{1}{3}$, $\frac{1}{16}$, $\frac{1}{4}$, $\frac{5}{8}$, and like fractions of the total area of an opening 30.

The invention will be further illustrated by description in connection with the following specific examples of the practice of it. In these examples and elsewhere herein proportions are expressed as parts by weight unless specifically stated to the contrary.

*Example 1*

A variegator, of the kind and dimensions stated above, was used. The plate 28 was rotated by manual force applied to the handhold 41 until all the openings 30 were in full registration with the inlets, here upper ends of the tubes 20, as noted from the positions of the indicators (as illustrated) on the lid 16. The strap 38 was then tightened, by mechanism 45, to hold the lid in the position set.

A frozen and aerated vanilla ice cream meeting New York state standards was pumped at a temperature of 22°–24° F. through the inlet pipes 44 under a pressure of 80 p.s.i. until the lower chamber 11 was filled with the ice cream. Fudge in aerated, cooled, but non-frozen condition at a temperature of 50 F. was pumped into the upper chamber through pipe 46 at about 85 p.s.i., as the variegating material of different color. It was thus forced downward through the tubes 20.

The rates of feed were about 18–20 pounds of the fudge for 100 total of the ice cream and fudge and in such amounts as to use 3.5 lbs. of fudge per minute.

The twister was rotated a full turn for each inch of such motion of the variegated mass. The result was slow rotation of the said mass so that the stripes introduced through tubes 20 were spiraled through about 360° for each inch of length of the output from the outlet 15. The result of the operation was a satisfactory and dependably variegated ice cream. Because the blade of the twister 18 strikes the fudge stripes at irregular intervals and stretches them, they may vary in thickness in the finished marbleized composition as from about 0.002–0.2 inch or more.

The plate 28 was rotated as desired, to change the amount or pattern of the rippling, without opening the apparatus, by loosening the screw in the tightening means 45, and setting the angular position of the lid 16 to correspond to the registration desired between the openings 30 and the tubes 20. The screw and, with it, the strap 38 around the edge of the lid were then tightened.

*Example 2*

The procedure of Example 1 is used except that any of the plastic products shown herein is substituted on an equal weight basis for the ice cream of Example 1.

*Example 3*

The procedures of the Examples 1 and 2 are used in turn except that the fudge is substituted by any of the other variegating or striping materials in proportions shown herein. When the said material is selected to be used in frozen condition, the temperature of it as introduced is kept below the melting point thereof.

It will be understood that it is intended to cover all changes and modifications of the examples of the invention herein chosen for the purpose of illustration which do not constitute departures from the spirit and scope of the invention.

I claim:

1. In a variegator for ice cream and like plastic product including a container, a separator dividing the container into upper and lower chambers and provided with inlets therethrough for the variegating material, an outlet from the lower chamber, and means for introducing the selected plastic product into the lower chamber and the variegating material into the upper chamber, the improvement comprising a plate disposed rotatably and in conforming relationship to the separator and provided with openings of size and spacing to be placed in registration and out of registration with the said inlets as the plate is rotated, a lid for the upper chamber, means for fixedly securing the said plate to the lid, whereby the rotation of the lid rotates the said plate, means outside the container for rotating the lid, whereby the plate provided with the said openings is also rotated, and means outside the container for holding the plate in the position to which rotated.

2. In a variegator for ice cream and like plastic product including a container, a separator dividing the container into upper and lower chambers and provided with inlets therethrough for the variegating material, an outlet from the lower chamber, and means for introducing the selected plastic product into the lower chamber and the variegating material into the upper chamber, the improvement comprising a plate disposed rotatably and in conforming relationship to the separator and provided with openings of size and spacing to be placed in registration and out of registration with the said outlets as the plate is rotated, a lid for the upper chamber, a rigid sleeve extending between the lid and said plate, said lid, plate, and separator each having a central hole in line with the sleeve, means holding the sleeve in fixed relation to the lid and said plate, a rotator for rotating the variegator composition disposed in the lower chamber, a drive shaft for the rotor extending through the sleeve and through the holes in line therewith, and means outside the container for rotating the lid, whereby the plate provided with the said openings is also rotated.

3. The variegator of claim 2, the container being cylindrical and the said plate fitting closely but rotatably within the container so as to restrict lateral movement of the said sleeve.

4. The variegator of claim 2 including tubes extending downward from each of the said inlets in direction generally parallel to the longer axis of the container and the means for introducing the plastic product into the lower chamber delivering the said product to the container at a level above the outlet from said tubes.

References Cited in the file of this patent

UNITED STATES PATENTS

| | | |
|---|---|---|
| 2,389,084 | Routh | Nov. 13, 1945 |
| 2,527,273 | Marks | Oct. 24, 1950 |
| 2,722,177 | Routh | Nov. 1, 1955 |